United States Patent Office 2,770,841
Patented Nov. 20, 1956

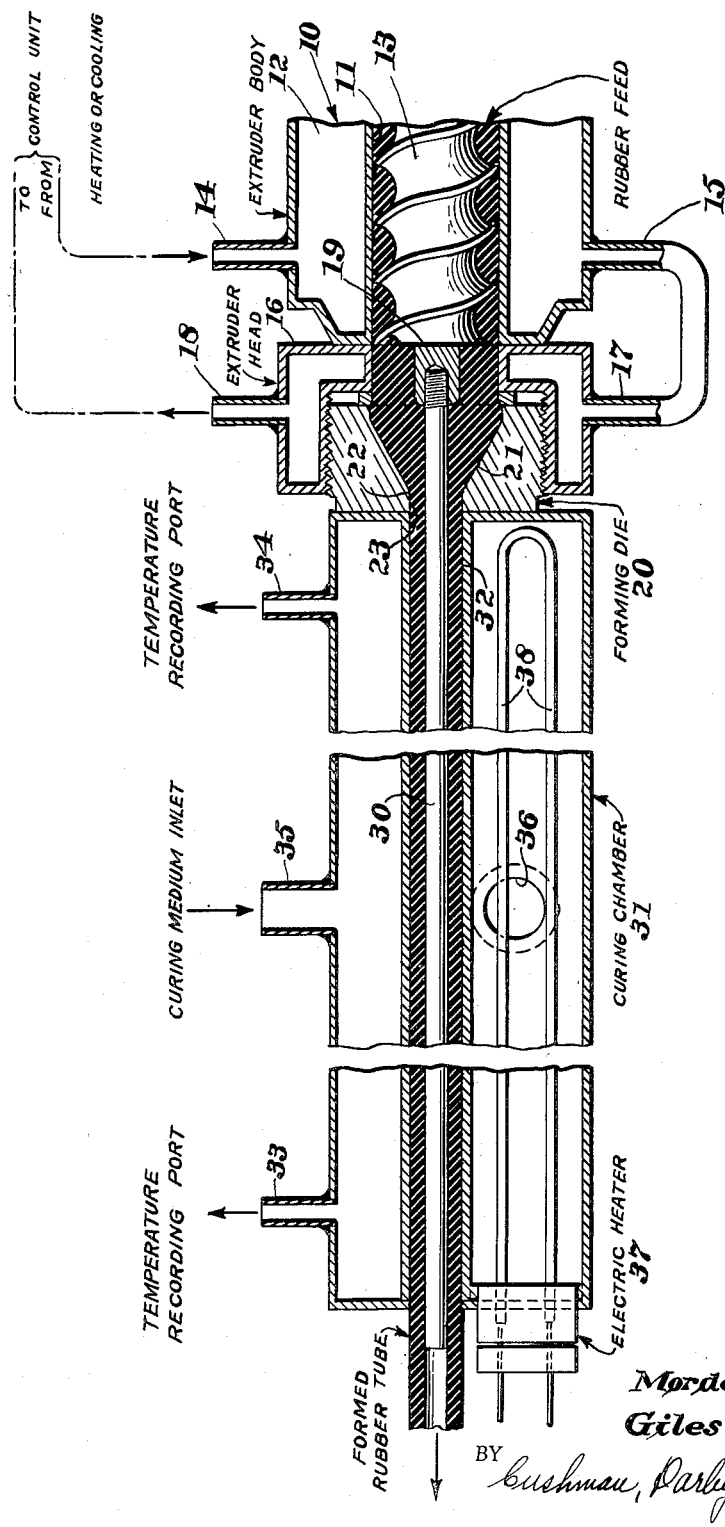

2,770,841

METHOD OF CONTINUOUS VULCANIZING OF RUBBER

Giles B. Cooke and Mordecai N. Timbs, Baltimore, Md., assignors to Crown Cork & Seal Company, Inc., Baltimore, Md., a corporation of New York Application September 4, 1952, Serial No. 307,888

5 Claims. (Cl. 18—53)

This invention relates to a method for forming extruded rubber tubing having precise dimensions from a vulcanizable material so that sections cut from the tubing will likewise be of precise dimensions, and hence, suitable for use as rubber rings for use in the rapid assembly of packers' caps.

It is an object of this invention to continuously cure a hollow article of indefinite length and made of vulcanizable material by passing the uncured article continuously and at a uniform rate in sliding contact over an internally positioned mandrel and between the heated walls of a vulcanizing chamber so that the tube is maintained in its original open position as it is formed when extruded while moving over the mandrel and through the vulcanizing apparatus.

Another object is to continuously produce hollow articles of indefinite length and made of vulcanizable material having precise dimensions so that sections cut from the hollow articles will be of predetermined precise dimensions. This feature is of great importance in the production of cured rubber rings for use in the rapid assembling of packers' caps where it is essential that the outside diameter of the cured rubber ring be exactly equal to the inside diameter of the cap, and that the rubber rings be of uniform wall thickness to insure proper sealing of the cap to the jar and to present an attractive appearance.

The foregoing, as well as other objects, will be made more apparent as this description proceeds, especially when considered in connection with the accompanying drawing which shows a longitudinal vertical sectional view illustrating the forward end of an extruder together with the associated mandrel and vulcanizing chamber.

As indicated above, this invention is primarily concerned with the manufacture of tubing formed of a vulcanizable material such as rubber, or any of the various synthetic rubbers. Broadly stated, the method of manufacture comprises extruding a vulcanizable material about a mandrel and between the heated walls of a vulcanizing chamber so that the tube is retained in its original open condition while moving over the mandrel and through the vulcanizing apparatus.

With the above in view, reference will now be made to the drawing in which reference character 10 designates generally an in-line extruder, the forward end only of which is shown. The particular type of extruder employed forms no part of the present invention, and any type of extruder may be used, the showing of an in-line extruder being merely exemplary.

The vulcanizable material is fed forward through a cylindrical tube 11 defined by a hollow extruder body 12 by means of a screw conveyor 13. The vulcanizable material within the tube 11 is maintained in suitable plastic condition by the flow of a heat transfer medium through the interior of the hollow extruder body 12. The medium enters and leaves the interior of the extruder body through inlet and outlet ports 14 and 15, respectively.

The vulcanizable material fed forward by screw conveyor 13 is delivered from the cylindrical tube 11 into the head section of the extruder 10 defined by a hollow extruder head 16. The plasticity of the vulcanizable material in the head section is controlled by the flow of a suitable heat transfer medium through the interior of the extruder head. The medium enters and leaves the interior of the extruder head through inlet and outlet ports 17 and 18, respectively, the temperature of the medium being controlled by means of a control unit, not shown.

A core bridge 19 is mounted within the head 16 by means of a spider secured to the interior of the extruder head 16. A mandrel 30 is mounted upon the core bridge 19 in any suitable manner, a threaded connection being illustrated.

The vulcanizable material is forced from the head section by the pressure of the material being fed forward by screw conveyor 13 into a forming die 20 which is secured to the extruder head 16 in any suitable manner, a threaded connection being illustrated. Internally tapered section 21 of the forming die 20 forces the vulcanizable material into intimate contact with the exterior of the mandrel 30. The forward end 22 of the interior of the forming die 20 defines an orifice, and forms in conjunction with the exterior of the mandrel 30 an annular orifice 23 through which the vulcanizable material is forced so that a continuous tube of uncured vulcanizable material is obtained. The internal diameter of the forward end of the forming die corresponds to the specified external diameter of the tubing to be manufactured, and the external diameter of the mandrel 30 corresponds to the specified internal diameter of the said tubing.

Reference character 31 designates generally a hollow curing chamber secured to the forming die 20 and having a tubular interior 32 corresponding to the internal diameter of the forward end of the forming die, and in axial alignment therewith. The curing chamber 31 is fitted with temperature recording ports 33 and 34, heating medium inlet 35 and thermostat port 36 for controlling the temperature of the heating medium.

The heating medium within the curing chamber 31 is maintained at the proper minimum temperature by a heater 37 (resistance element 38 connected to a source of electrical energy being illustrated) which serves to heat the medium. The temperature of the heating medium is prevented from becoming excessively high by a thermostat, not shown, positioned at port 36, cutting off the current to the electric heater 37. As the temperature of the heating medium decreases, the thermostat will automatically turn on the current to the electric heater 37 and it will remain on until operating temperature is reached. Thermocouples, not shown, employed to record the temperature of the heating medium, are inserted in the temperature recording ports 33 and 34.

It should be noted that the drawing is only diagrammatic with respect to the heating technique employed, since other heating expedients may be used. For example, the curing device could be solid with resistance wires embedded therein and connected to a source of electrical energy. If desired, a heat transfer medium may be circulated through the interior of the mandrel (which can be made hollow for this purpose) so that heat can be supplied through the interior of the screw conveyor 13, which may be made hollow for this purpose, to effect heating from both the exterior and the interior of the tube at the same time to derive greater uniformity of vulcanization. It is also feasible to insulate the curing chamber and mandrel from the remainder of the extruder and the connect them to a source of high frequency alternating current so that heat can be supplied in that manner to derive the additional benefits of more uniform temperature conditions which this heating expedient is well known to be capable of.

By fastening the curing chamber 31 directly to the extruder 10, the tube to be manufactured is thereby supplied with vulcanization conditions immediately and without pause upon its being extruded through the annular orifice 23.

It should be apparent that the device as represented may be suitably modified to provide for attachment to tubular extruders of other constructions, and such modification is considered to be within the scope of the instant invention.

The length of the mandrel and curing devices will, of course, be determined by the particular vulcanizable material being cured, the thickness of the material, the rate of motion of the tube to be cured through the curing device, and the temperature of the curing device, as well as other well known factors.

A specific embodiment is hereinafter given as illustrative of the operation of the instant method and apparatus.

A rubber formula as follows:

| | Parts |
|---|---|
| Natural rubber | 200.00 |
| Circo oil | 20.00 |
| Stearic acid | 4.00 |
| Zinc oxide | 20.00 |
| Clay | 230.00 |
| Talc | 271.50 |
| Wax, ceresin | 30.00 |
| Calcium oxide | 30.00 |
| Red oxide | 10.00 |
| Sulfur | 6.00 |
| Altax | 2.00 |
| Bismate | 2.50 |
| Tetrone A | 2.00 | is compounded in the usual way on a rubber mill. The material is then extruded at elevated temperature through an extrusion machine, from which it passes into a heated tube mold connected directly to the head of the extruding machine, and forming an extension of the extrusion chamber. In the production of a jar ring of ⅜-inch thickness, and without employment of a heated mandrel, the curing device is maintained at from 400–450° F., the exact temperature depending on the particular nature of the composition being extruded. The extruded tube is passed through at a rate of slightly less than four feet per minute (a rate slighly in excess of four feet per minute may be employed at 450° F.). Under these conditions, a curing device of 22 inches in length was found to be suitable. Curing devices 30 inches in length are not impractical, and the only requisite in this regard is that the device be long enough to insure cure under the working conditions and be of some practical dimension. The specific formula here presented, while extremely well suited for utilization in accordance with the present invention, is not an indispensible feature thereof. The calcium oxide content thereof greatly facilitates speed of curing, but slower curing compositions may be utilized. Other compositions are known capable of rapid cure, and for that reason, are adapted to advantageous employment in the instant relationship.

The problem of adherence of the rubber to the curing device and mandrel must, of course, be accounted for. As an illustration of anti-stick measures which may be suitably employed, the contacting surfaces are chromium-plated and coated with conventional mold release agents, such as those of the silicone type.

The resulting product has been found to possess exceptionally uniform dimensions. Transverse sections cut from a cured tube produced as aforesaid possess identical dimensions within very close tolerances. These sections are ideally suited for use as jar rings where preciseness and uniformity of dimension are of the essence when the rings are to be employed in the rapid assembling of packers' caps.

Many procedures for the production of tubular articles are known, and some of these are similar to the instant procedure. Nowhere was it realized that any one of these procedures was especially adapted for the production of cured tubes of precise and uniform dimension, and hence would be suitable for employment in the production of jar rings.

We claim:

1. A process for the continuous production of cured tubes of vulcanizable material of precise and uniform dimensions which comprises continuously and uniformly extruding in uncured tubular form a substantially rapidly curable rubber composition, so compounded as to cure in not over about one half a minute when exposed to a temperature of 400–450° F., said extrusion being at an elevated temperature but below the curing temperature, and thereafter immediately and without pause, drawing the uncured tube through a zone maintained at a constant elevated curing temperature while in sliding internal contact with a supporting mandrel to cure the tubular article, and continuously and uniformly withdrawing the cured tubular article from the curing zone at said temperature into the open air.

2. A process according to claim 1 in which curing is effected at approximately 400–450° F.

3. A process according to claim 1 wherein calcium oxide is present as an accelerator to facilitate the speed of curing.

4. A process according to claim 1 wherein the rubber composition is compounded to cure in about one half a minute and the curing is done at 400–450° F. in the presence of calcium oxide to facilitate the speed of curing and the rubber is natural rubber.

5. A process for the continuous production of cured tubes of vulcanizable material of precise and uniform dimensions which comprises continuously and uniformly extruding in uncured tubular form a substantially rapidly curable rubber composition, so compounded as to cure in not over about five-eighths of a minute when exposed to a temperature of 400–450° F., said extrusion being at an elevated temperature but below the curing temperature, and thereafter immediately and without pause, drawing the uncured tube through a zone maintained at a constant elevated curing temperature while in sliding internal contact with a supporting mandrel to cure the tubular article, and coninuously and uniformly withdrawing the cured tubular article from the curing zone at said temperature into the open air.

References Cited in the file of this patent

UNITED STATES PATENTS

| 738,295 | Coldren | Sept. 8, 1903 |
| 1,528,263 | Peelle | Mar. 3, 1925 |
| 1,770,396 | Fuller | July 15, 1930 |
| 1,780,948 | Sherman | Nov. 11, 1930 |
| 2,386,796 | Hoffecker | Oct. 16, 1945 |
| 2,666,947 | Shaw | Jan. 26, 1954 |

FOREIGN PATENTS

| 105,426 | Great Britain | Apr. 19, 1917 |